(12) United States Patent
Li

(10) Patent No.: US 6,736,402 B1
(45) Date of Patent: May 18, 2004

(54) FERROFLUIDIC SEAL WITH CONTROLLED LEAKAGE TO MINIMIZE EFFECTS OF SEAL STAGE BURSTING

(75) Inventor: Zhixin Li, Hudson, NH (US)

(73) Assignee: Ferrotec (USA) Corporation, Nashua, NH (US)

( * ) Notice: Subject to any disclaimer, the term of this patent is extended or adjusted under 35 U.S.C. 154(b) by 0 days.

(21) Appl. No.: 10/153,433

(22) Filed: May 22, 2002

(51) Int. Cl.$^7$ ................................................ F16J 15/43
(52) U.S. Cl. ........................................ 277/410; 277/411
(58) Field of Search ................................. 277/410, 411

(56) References Cited

U.S. PATENT DOCUMENTS

| | | | |
|---|---|---|---|
| 4,478,424 A | * 10/1984 | Raj | 277/302 |
| 4,671,679 A | * 6/1987 | Heshmat | 384/133 |
| 4,844,138 A | * 7/1989 | Kokubu | 152/417 |
| 5,686,941 A | * 11/1997 | Kojima | 277/347 |
| 6,247,701 B1 | * 6/2001 | Kitada et al. | 277/410 |
| 6,543,782 B1 | * 4/2003 | Rosensweig et al. | 277/410 |

FOREIGN PATENT DOCUMENTS

JP 5010451 1/1993

* cited by examiner

Primary Examiner—Anthony Knight
Assistant Examiner—E Peavey
(74) Attorney, Agent, or Firm—Mesmer & Deleault, PLLC

(57) ABSTRACT

In a ferrofluid seal that supports a pressure differential between a low pressure side and a high pressure side, a reservoir is created between a first seal stage at the low pressure side and its adjacent seal stage. The volume of the reservoir is relatively large compared to the volumes of the interstage areas between the other seal stages. In addition, a controlled leakage path bypasses the first stage from the reservoir to the low-pressure area. The leakage rate through the bypass path is controlled so that gas in the reservoir leaks to the low-pressure area relatively slowly, for example, the bypass path might equalize the pressure across the first stage over a five-minute interval. This arrangement prevents a seal stage burst from disgorging a large gas volume into the low-pressure side.

23 Claims, 4 Drawing Sheets

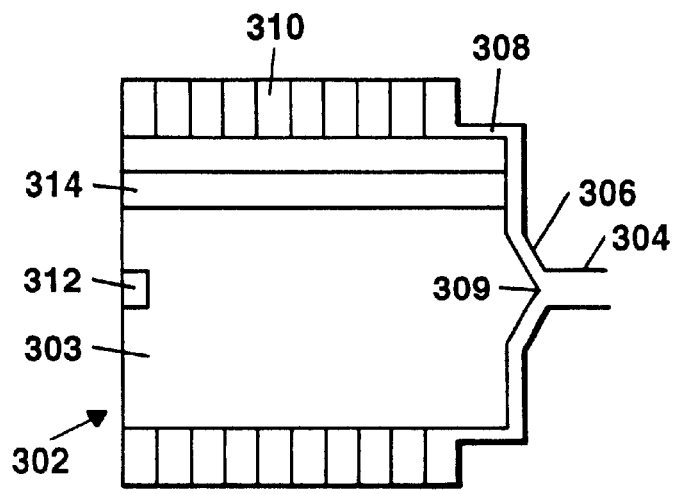
*Figure 3C*
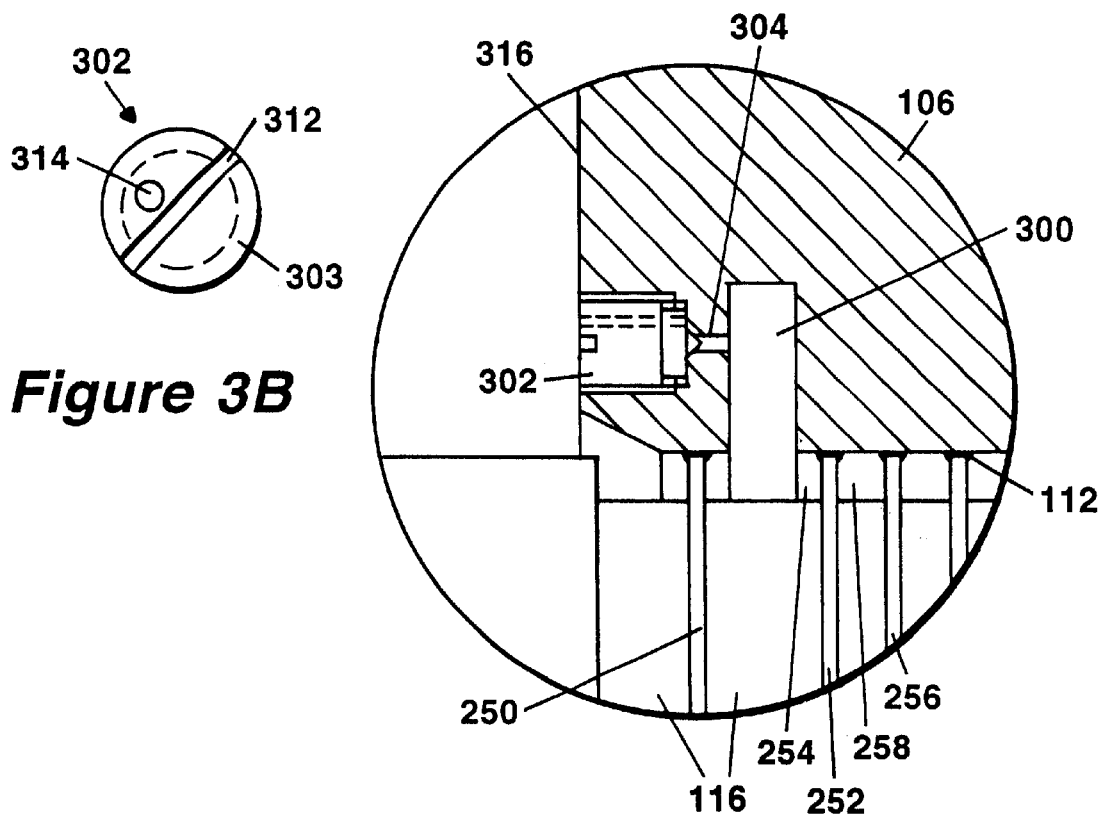
*Figure 3B*
*Figure 3A*

FERROFLUIDIC SEAL WITH CONTROLLED LEAKAGE TO MINIMIZE EFFECTS OF SEAL STAGE BURSTING

FIELD OF THE INVENTION

This invention relates to ferrofluidic seals and, in particular, to apparatus that ameliorates the effect of seal stage bursting in high-vacuum environments.

BACKGROUND OF THE INVENTION

Ferrofluidic rotary seals have been widely used in vacuum applications over the past 20 years. The basic structure of the seal comprises one or more magnets, a rotary shaft, pole pieces, and a housing. Additional parts may also be present as is known in the art. The magnets, the pole pieces and the rotary shaft form magnetic circuits with air gaps that occur between the pole pieces and the shaft. A ferrofluid is placed in the air gaps and forms a liquid O-ring rotary seal between the pole pieces and the rotary shaft. As used herein, a ferrofluid comprises magnetic particles coated with a surfactant that are suspended in a carrier liquid that may be water or oil. The magnetic particles are sufficiently small (approximately 10 nanometers) that they are colloidally suspended in the carrier liquid. A rubber O-ring at the radial interface usually provides a seal between the stationary parts, such as that between a pole piece and the housing. Seals with the above structure have been effectively used in a wide variety of applications, such as semi-conductor manufacturing, optical coating, rotary gas unions etc.

Due to the fact that a liquid forms the seal, the pressure capacity of a single seal stage is limited and is dependent upon the magnetic circuit design and the magnetization of the ferrofluid. Typically, one stage can withstand a 2–4 psi pressure difference across the stage without failure. Consequently, in applications that require a seal to withstand a pressure differential more than can be supported by a single stage, multiple seal stages are used.

A typical seal and bearing unit 100 with multiple seal stages is shown in sectional view in FIG. 1. The unit 100 comprises a non-magnetic housing 102 that surrounds a rotary shaft 104 fabricated from a magnetic material. The ferrofluid seal is comprised of magnetic pole pieces 106 and 108, magnet 110 and the shaft 104. The seal pieces form a magnetic circuit indicated schematically by dotted box 115. The pole pieces 106 and 108 extend close to, but do not touch, the shaft 104 to form small gaps between the pole pieces 106, 108 and shaft 104. The magnetic circuit 115 extends across gaps between pole pieces 106 and 108. A ferrofluid 112, located in the gaps is held in position by the magnetic field in the gaps. Rubber O-rings 130 and 132 seal the stationary pole pieces, 106 and 108, respectively, to the housing 102 to support the pressure differential between a low pressure (vacuum) area 101 and a high pressure (which may be atmospheric) area 103.

The seal unit 100 may also include a bearing assembly 128 that has one or more bearings 124 and 126. The unit is completed by a cover plate 118, fastened to an end of the housing 102 by clamping screws, of which screws 120 and 122 are shown in FIG. 1.

Although there are only two pole pieces 106 and 108, slots 116 are cut into the shaft to form multiple seal stages. Alternatively, slots may be cut into the faces of the pole pieces that oppose the shaft 104 to form the seal stages. At each seal stage the magnetic fluid forms a liquid O-ring, which provides a hermetic seal between the rotary shaft 104 and the stationary pole piece 106, 108. Thus, multiple seal stages are formed each of which can support a pressure differential. This arrangement is shown in greater detail in FIG. 2.

In FIG. 2, the shaft 104 has a plurality of slots 116 cut into its surface, leaving a plurality of ring-shaped teeth 250, 252, 256, etc. The teeth extend close to, but do not touch the inner surface 105 of pole piece 106. Because the magnetic field in concentrated in the gaps between the teeth 250, 252, 256 and inner surface 105 of pole piece 106, ferrofluid 112 is attracted to the gaps and forms a plurality of seal stages. Each of these seal stages will be referred to below by the numeral designation of the tooth that forms it. Interseal areas 254, 258, etc. exist between each seal stage.

During a pump down process in which a pressure differential is applied across the seal, the differential pressure across the first stage 250 facing the vacuum side of the seal is increased due to the vacuum. Once the differential pressure exceeds the pressure capacity of the first stage 250, the ferrofluid 112 at the first stage 250 is temporarily pushed out of the gap and the seal stage "bursts" to relieve some of the pressure differential across the stage 250. When the seal stage 250 bursts, the stage 250 allows part of the gas stored in the interstage area 254 between the first stage 250 and the second stage 252 to leak into the vacuum area 101, thereby reducing the gas pressure in the interstage area 254. Thus, the differential pressure across the first stage 250 is reduced while the pressure differential the second stage 252 is increased.

Eventually, the pressure differential across the second seal stage 252 will exceed the capacity of the seal stage and it too will burst, thereby decreasing the pressure differential across it and increasing the pressure differential across the first seal stage 250 and the third seal stage 256. Sometimes the increase in pressure differential caused by a seal stage bursting can increase the pressure differential across an adjacent stage causing it to burst also. A "cascade" effect results until a volume of gas is released into the low-pressure area. Such a process continues between the stages during the pump down process, until the differential pressure between vacuum area 101 and the atmospheric area 103 is approximately equally shared by a plurality of seal stages. Each time the first stage 250 bursts, the pressure in the vacuum area fluctuates and the gas in the interstage area is released into the vacuum area.

Typically, the aforementioned bursting phenomenon is not harmful during the pump down process because at this time, a processing job inside the vacuum chamber that requires a high vacuum has not been started. This processing job can be wafer processing in semiconductor industry, thin film coating in the optics component industry or some other conventional processing job that requires high vacuum. However, various factors, such as shaft rotation and pressure variations can cause a seal to burst after pump down. If seal stage bursting continues while the processing job proceeds, the resulting pressure fluctuations and release of gas into the vacuum chamber is not desirable. In particular, the larger the amplitude of the pressure fluctuation, the more deleterious the consequences to the processing job. A typical pump down profile is illustrated in FIG. 5 that shows the processing chamber pressure on the vertical scale versus time on the horizontal scale. As shown, with a conventional multiple stage ferrofluid seal, seal stage bursting can cause the pressure in a vacuum chamber to fluctuate over three orders of magnitude, for example, from $10^{-7}$ Torr to $10^{-5}$ Torr, then back to $10^7$ Torr in a period of a few seconds as shown by the pressure spike 500.

Therefore, there is a need for a ferrofluid seal structure that minimizes the impact of seal stage bursting during the processing phase of a job.

SUMMARY OF THE INVENTION

In accordance with the principles of the invention, a reservoir is created between the first seal stage at the low-pressure side and its adjacent seal stage. The volume of the reservoir is relatively large compared to the volumes of the interstage areas between the other seal stages. In addition, a controlled leakage path bypasses the first stage from the reservoir to the low-pressure area. The leakage rate through the bypass path is controlled so that gas in the reservoir leaks to the low-pressure area relatively slowly; for example, the bypass path might equalize the pressure across the first stage over a five-minute interval.

Consequently, when a processing job is occurring, bursting will not occur at the first stage since the differential pressure across the first stage is much lower than its pressure capacity, due to the controlled leakage through the bypass path that reduces the pressure differential during the pump down process. When fluid bursting occurs at stages behind the second stage, such as the third, the fourth, or the fifth stage, the pressure in the vacuum area will not fluctuate because the second stage provides a seal. When the second stage bursts, the gas that is released is stored in the reservoir. Since the capacity of the reservoir is large relative to the interstage volume between the second and third stages, the first stage will not burst when the second stage bursts. The gas in the reservoir is then slowly released via the leakage path into the vacuum area. However, because the leakage rate is relatively slow, rapid fluctuations in the vacuum area are avoided and the small volume of gas released into the processing area can easily be handled by the pump down mechanism.

In one embodiment, the leakage rate through the bypass path is adjustable. For example, a needle valve or other adjustable leakage path can be used.

In another embodiment, the bypass path is routed through a seal pole piece. In yet another embodiment, the bypass path is routed through the teeth that form the seal stages.

BRIEF DESCRIPTION OF THE DRAWINGS

The above and further advantages of the invention may be better understood by referring to the following description in conjunction with the accompanying drawings in which:

FIG. 3A is a magnified partial sectional view of the ferrofluid seal stages in a ferrofluid seal constructed in accordance with the principles of the present invention incorporating a reservoir and an adjustable bypass path in the seal pole piece.

FIG. 3B is a plan view of a valve that can be used to adjust the leakage rate in the bypass path.

FIG. 3C is a sectional view of the valve shown in FIG. 3B, taken along sectional lines A—A.

DETAILED DESCRIPTION

Figure 1:
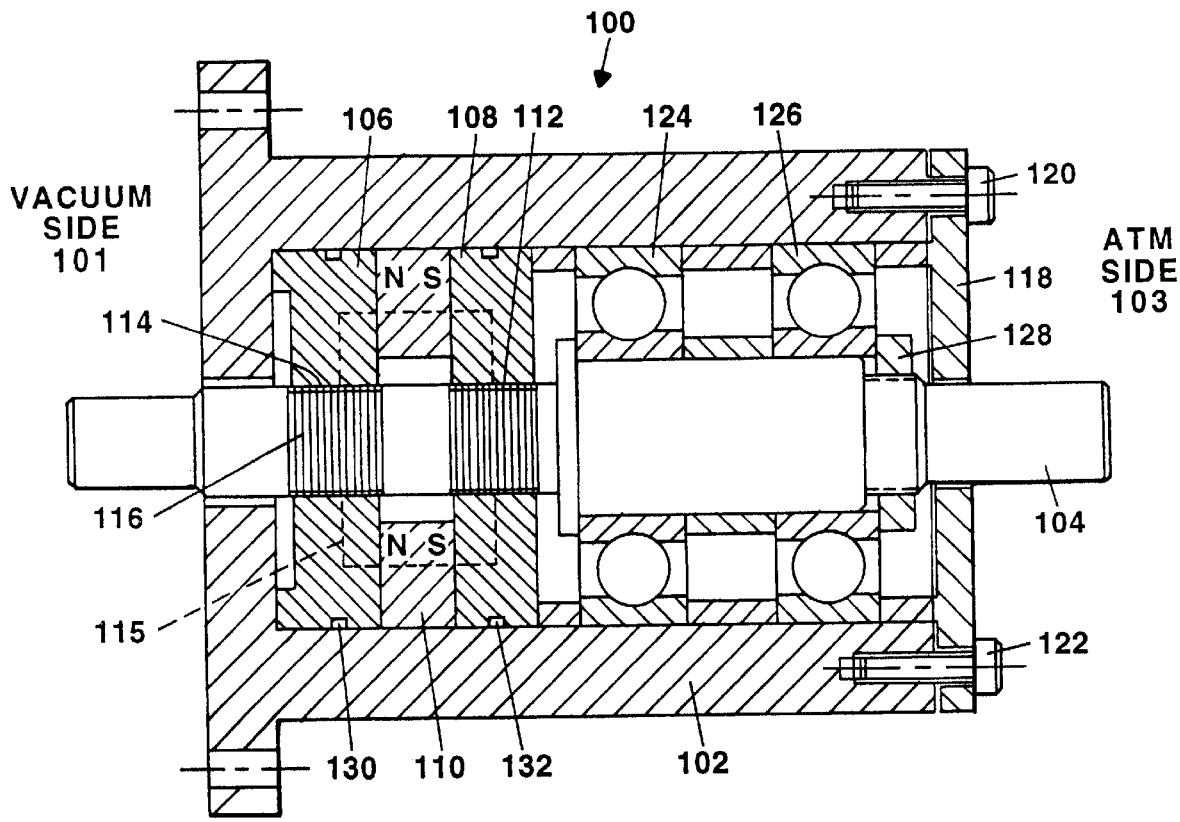
FIG. 1 is a partial sectional view of a conventional multiple stage ferrofluid seal unit incorporating a ferrofluid seal and bearings in a housing.
Figure 2:
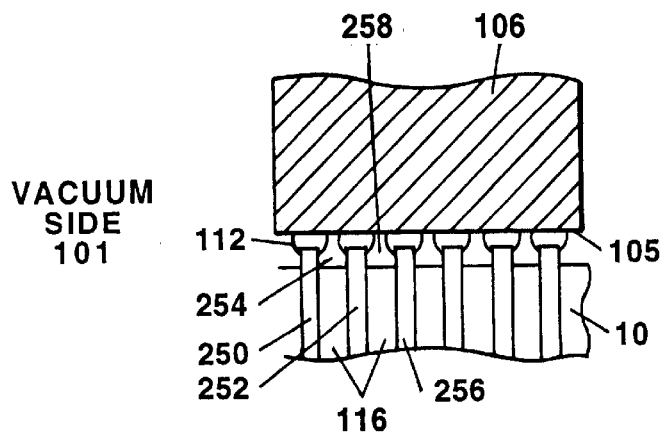
FIG. 2 is a magnified partial sectional view of the ferrofluid seal stages in the ferrofluid seal shown in FIG. 1.

FIGS. 3A, 3B and 3C illustrate a modification of the ferrofluid seal in accordance with the principles of the invention. Specifically, as shown in FIG. 3A, a reservoir 300 has been added to the interstage area 254 between the first seal stage 250 next to the low pressure area 101 and the second seal stage 252. In the embodiment shown in FIGS. 3A–3C, the reservoir 300 has been created by cutting an annular ring into the pole piece 106. The volume of the reservoir 300 is relatively large compared to the volumes of the interstage areas between the other seal stages, such as areas 254 and 258. The volume of the reservoir 300 should be large enough to handle the gas released from bursting of the second stage seal and other seal stages during a cascading burst, as discussed above.

Reservoir 300 is connected to an adjustable leakage valve 302, via bypass path 304. The controlled leakage bypass path bypasses the first stage 250 from the reservoir 300 to the low-pressure area 101. The leakage rate through the bypass path 304 is controlled so that gas in the reservoir 300 leaks to the low-pressure area 101 relatively slowly. For example, the bypass path 304 might equalize the pressure across the first stage 250 over a five-minute interval.

The leakage rate through the bypass path 304 is controlled by valve 302 that is shown in more detail in FIGS. 3B and 3C. In the embodiment shown the valve body 303 with external threads 310 is screwed into a bore hole 308 drilled into the face 316 of pole piece 106. The hole 308 is internally tapped to match the threads 310 of valve 302. The valve body 303 has a conical end 309 which fits into a conical seat 306 at the end of hole 308 which communicates with bypass passage 304. The end 309 and the seat 306 form a needle valve to regulate the leakage rate through bypass passage 304. Gas escaping from the needle valve passes through the valve body 303 via bypass channel 314. The valve may be adjusted to control the leakage rate by turning the valve body 303 by means of a screwdriver in slot 312.

Figure 4:
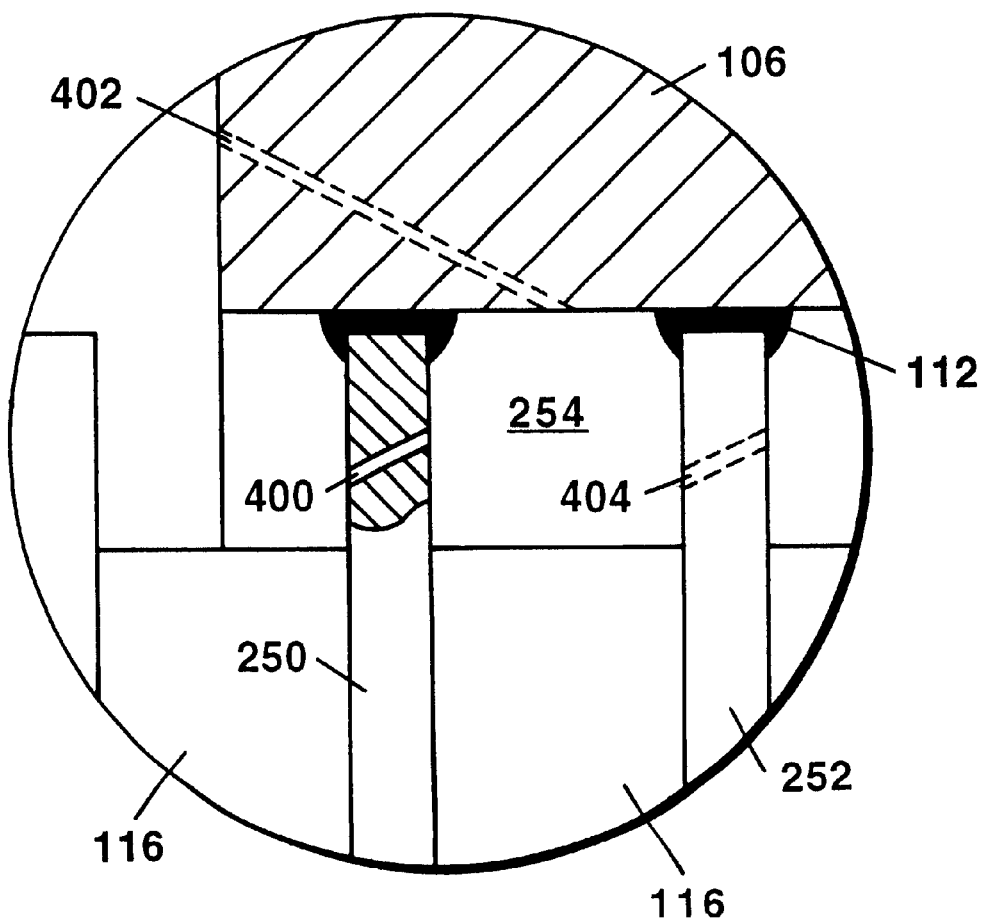
FIG. 4 is a magnified partial sectional view of the ferrofluid seal stages in a ferrofluid seal constructed in accordance with the principles of the present invention incorporating a reservoir and a bypass path in the tooth that forms the first stage seal.
Figure 5:
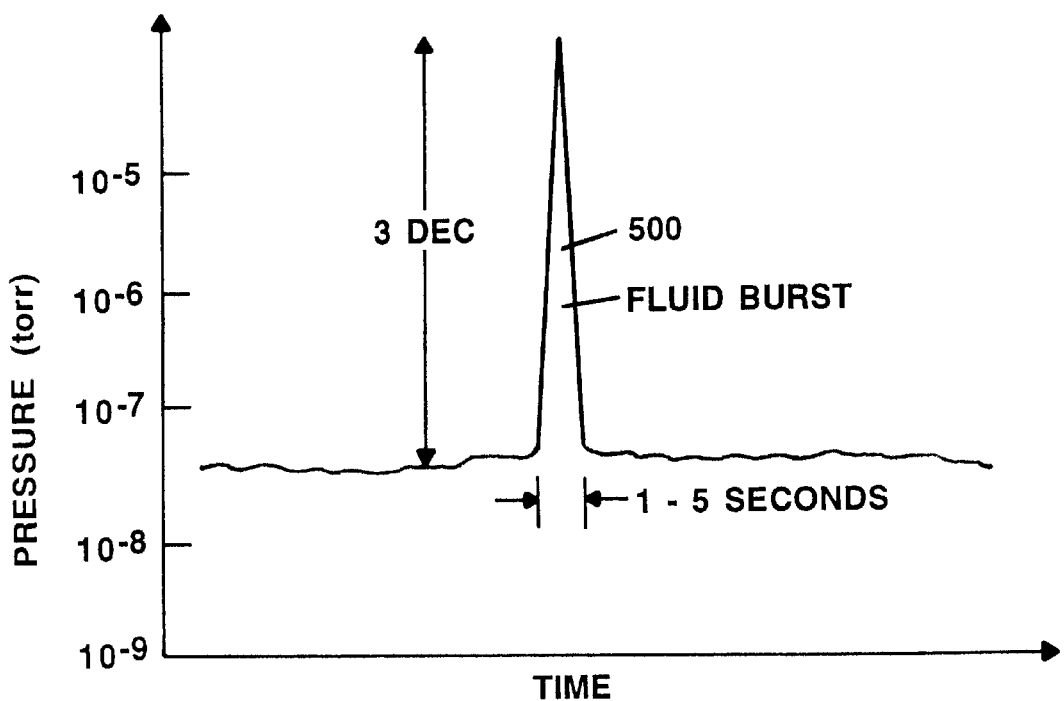
FIG. 5 is a graph of the pressure in the low-pressure area versus time illustrating the pressure fluctuation in the low-pressure area caused by seal stage bursting in a conventional multiple stage ferrofluid seal.

Another embodiment is shown in FIG. 4 that illustrates a detail at the face of pole piece 106. If an acceptable leakage rate can be found, for example, through experiments, a leakage path that bypasses the first stage 250 can be created by one or more fixed size "microholes" 400 that pass through the tooth 250 that creates the first seal stage. Such an arrangement greatly reduces the manufacturing cost of the seal. In an alternative embodiment, one or more leakage holes 402 can be made through the pole piece 106 in place of, or in addition to, the holes 400 in the shaft tooth 250. In another embodiment one or more leakage holes can be made through the shaft teeth that create other seal stages, such as leakage hole 404 on tooth 252 to further smooth seal bursting. In another embodiment, a shielding mechanism can be made to protect the leakage hole to prevent dust and/or ferrofluid from filling and blocking the leakage path.

It has been found that, in both the embodiment illustrated in FIGS. 3A–3C and the embodiments illustrated in FIG. 4, for practical applications, the cross-sectional area of the leakage path has to be smaller than 0.0003 square inches. For most applications, it is preferable that the cross-sectional area is smaller than 0.000003 square inches. These holes cannot be easily drilled with conventional machining practice, but can be formed by other known processes, such as laser drilling. It is also possible to mechanically drill a larger hole and then place into the hole (by press fitting, gluing, etc.) a controlled leak insert with a proper-sized hole therethrough. The proper cross-sectional areas can also be achieved using the adjustable path mechanism illustrated in FIGS. 3A–3C.

Figure 6:
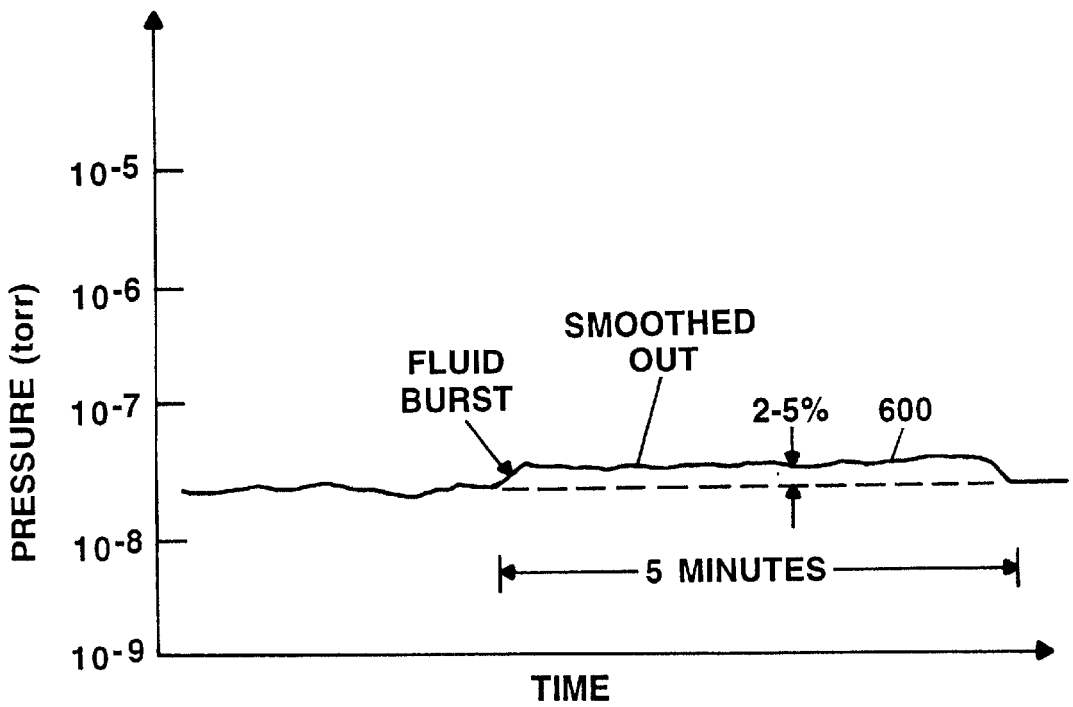
FIG. 6 is a graph of the pressure in the low pressure area versus time illustrating the pressure fluctuation in the low pressure area caused by seal stage bursting in a multiple stage ferrofluid seal constructed in accordance with the principles of the present invention.

When the processing job is on going, bursting will not occur at the first stage 250 since the differential pressure across the first stage 250 will always be much lower than its pressure capacity, because of the controlled leakage across the stage. When ferrofluid bursting occurs at stages behind the second stage 252, such as the third 256, the fourth, or the fifth stage, the vacuum chamber will not be impacted because the second stage 252 is providing hermetic sealing. When the second stage 252 bursts, the resulting gas burst will be first stored in the reservoir 300 between the first stage 250 and the second stage 252, avoiding an immediate, large scale impact to the vacuum chamber pressure. This gas then will be gradually pumped out over a relatively long period of time via the leakage path 304. In essence, this operation smoothes a burst of a few hundred times fluctuation lasting a few seconds to a slow change of a few percent, lasting a few minutes, as shown in FIG. 6 where the pressure "spike" 600 has been smoothed out.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A ferrofluid seal having a plurality of seal stages arranged in series to support a gas pressure differential between a low pressure side in which a manufacturing process is occurring and a high pressure side, comprising:
    a reservoir located between a first seal stage at the low pressure side and an adjacent seal stage, the reservoir having a volume that is large enough to contain all gas that is released into the reservoir due to bursting of the adjacent and other seal stages without causing the first seal stage to burst; and
    a bypass path connecting the reservoir to the low-pressure side and having a controlled leakage rate that is small enough to prevent gas entering into the low-pressure side from the reservoir from interfering with the manufacturing process.

2. The ferrofluid seal of claim 1 wherein the controlled leakage rate through the leakage path is sufficiently small that fluid in the reservoir leaks to the low-pressure side over a predetermined time interval.

3. The ferrofluid seal of claim 1 wherein the bypass path includes a valve that determines the controlled leakage rate.

4. The ferrofluid seal of claim 3 wherein the valve can be adjusted from a position external to the ferrofluid seal in order to change the controlled leakage rate.

5. The ferrofluid seal of claim 1 wherein the bypass path has a cross-sectional area of less than 0.0003 square inches.

6. The ferrofluid seal of claim 1 wherein the bypass path has a cross-sectional area of less than 0.000003 square inches.

7. A method of reducing the effects of seal bursting in a ferrofluid seal having a plurality of seal stages that support a pressure differential between a low pressure side and a high pressure side, the method comprising:
    (a) inserting a reservoir located between a first seal stage at the low pressure side and an adjacent seal stage, the reservoir having a volume that is large enough to contain all gas that is released into the reservoir due to bursting of the adjacent and other seal stages without causing the first seal stage to burst; and
    (b) connecting the reservoir to the low-pressure side with a bypass path having a controlled leakage rate that is small enough to prevent gas entering into the low-pressure side from the reservoir from interfering with the manufacturing process.

8. The method of claim 7 further comprising:
    (c) controlling the leakage rate through the leakage path so that fluid in the reservoir leaks to the low-pressure side over a predetermined time interval.

9. The method of claim 7 wherein the bypass path includes a valve that determines the controlled leakage rate.

10. The method of claim 9 further comprising:
    (d) adjusting the valve from a position external to the ferrofluid seal in order to change the controlled leakage rate.

11. The method of claim 7 wherein the bypass path has a cross-sectional area of less than 0.0003 square inches.

12. The method of claim 7 wherein the bypass path has a cross-sectional area of less than 0.000003 square inches.

13. A ferrofluid seal having a shaft and a pole piece arranged to form a plurality of gaps between the pole piece and the shaft, a magnet for inducing a magnetic field in each of the gaps and ferrofluid held in each of the gaps by the magnetic field, the ferrofluid in the gaps forming a plurality of seal stages formed about the shaft that support a pressure differential between a low pressure side in which a manufacturing process is occurring and a high pressure side, the ferrofluid seal comprising:
    a reservoir located between a gap forming a first seal stage at the low pressure side and a gap forming an adjacent seal stage, the reservoir having a volume that is large enough to contain all gas that is released into the reservoir due to bursting of the adjacent and other seal stages without causing the first seal stage to burst; and
    a bypass path connecting the reservoir to the low-pressure side and having a controlled leakage rate that is small enough to prevent gas entering into the low-pressure side from the reservoir from interfering with the manufacturing process.

14. The ferrofluid seal of claim 13 wherein the bypass path includes a valve that determines the controlled leakage rate.

15. The ferrofluid seal of claim 14 wherein the valve is located in the pole piece.

16. The ferrofluid seal of claim 13 wherein the bypass path passes through the pole piece.

17. The ferrofluid seal of claim 16 wherein the bypass path comprises a hole with a predetermined diameter.

18. The ferrofluid seal of claim 17 wherein the predetermined diameter is less than 0.01 inches.

19. The ferrofluid seal of claim 18 wherein the predetermined diameter is less than 0.001 inches.

20. The ferrofluid seal of claim 13 wherein the shaft has a plurality of teeth that form the plurality of gaps and wherein the bypass path passes through one of the plurality of teeth.

21. The ferrofluid seal of claim 20 wherein the bypass path comprises a hole with a predetermined diameter.

22. The ferrofluid seal of claim 20 wherein the predetermined diameter is less than 0.01 inches.

23. The ferrofluid seal of claim 22 wherein the predetermined diameter is less than 0.001 inches.

* * * * *